United States Patent [19]

Wellman

[11] Patent Number: 4,820,923
[45] Date of Patent: Apr. 11, 1989

[54] UNCOOLED REFLECTIVE SHIELD FOR CRYOGENICALLY-COOLED RADIATION DETECTORS

[75] Inventor: William H. Wellman, Goleta, Calif.
[73] Assignee: Santa Barbara Research Center, Goleta, Calif.
[21] Appl. No.: 876,024
[22] Filed: Jun. 19, 1986
[51] Int. Cl.⁴ .............................. G01J 5/08; G01J 5/06
[52] U.S. Cl. .................................... 250/352; 250/353; 350/276 SL
[58] Field of Search ................... 250/352, 353, 338 R, 250/330; 350/276 SL, 276 R, 319

[56] References Cited

U.S. PATENT DOCUMENTS

| | | | |
|---|---|---|---|
| 2,738,700 | 3/1956 | Taylor | 350/276 SL |
| 3,445,659 | 5/1969 | Guimento et al. | 250/352 |
| 4,217,026 | 8/1980 | Radovich | 350/276 SL |
| 4,339,748 | 7/1982 | Guscott et al. | 250/352 |
| 4,431,917 | 2/1984 | Gibbons | 250/352 |
| 4,507,551 | 3/1985 | Howard et al. | 250/352 |
| 4,542,963 | 9/1985 | Linlor | 350/319 |

FOREIGN PATENT DOCUMENTS 2115143  9/1983  United Kingdom ............... 250/353

Primary Examiner—Janice A. Howell
Assistant Examiner—William F. Rauchholz
Attorney, Agent, or Firm—W. C. Schubert; V. G. Laslo; A. W. Karambelas

[57] ABSTRACT

A warmshield reflector for a cryogenically cooled radiation detector has a reflective surface of toroidal shape. The surface has geometric properties which cause a ray emanating from the detector to be reflected such that a ray is imaged as a defocused ring outside of and surrounding the active detector area. Several such segments are located in front of a small, cryogenically cooled detector shield, to provide an overall detector shielding effect similar to that of a larger, cryogenically cooled shield.

10 Claims, 3 Drawing Sheets

UNCOOLED REFLECTIVE SHIELD FOR CRYOGENICALLY-COOLED RADIATION DETECTORS

BACKGROUND OF THE INVENTION

This invention relates to uncooled reflective shields for cryogenically-cooled radiation detectors and, more particularly, to an uncooled reflective shield having multiple segments, each of substantially toroidal shape.

It has been known for some time that proper cold shielding of a high performance infrared detector limits radiation incident upon the detector to that emanating within the optical field of view, thereby improving detectivity, or sensitivity, for the given characteristics of the optical system, object, and detector. The most efficient infrared systems employ a coldshield, which is cooled by a cryogenic cooler, or coldfinger. The coldshield may extend many detector widths away from the detector focal plane, thus establishing an efficient definition of the desired incident ray cone. Ideally, the coldshield would include an acceptance aperture at the exit pupil of the optical system, hereinafter called the entrance pupil of the detector. Unfortunately, such construction has generally required a relatively long and massive shield, cantilevered forward from the detector. This type of shield necessitates the support and cooling of a large physical mass, which increases the difficulty of meeting fast cooldown times and minimum steady-state heat loads.

Previous coldshield designs have a further disadvantage in that optical lens elements between the acceptance aperture of the coldshield and the detector are not readily accommodated, since they complicate the construction of the cold structure. They also tend to increase both the cooldown time and coldfinger deflection at the detector.

In order to reduce the mass of the coldshield, warmshielding has been employed in infrared detector systems. The warmshield gives an intended equivalent shielding result by imaging the detector back upon itself by means of a spherical or elliptical or flat reflector. This type of reflector is not cooled but is left at ambient temperature.

However, the use of the above mentioned types of warmshield geometries gives rise to certain disadvantages. Spherical warmshields are large in diameter and hence are not appropriate for compact infrared detector systems. They also fail to reproduce true coldshield performance since they image the detector, which is an object having a definite and variable reflectance. For example, modern detector arrays may have a finely patterned structure that causes variable geometric reflections from the surface, as well as diffraction scattering and other variable geometric reflection effects. Elliptical warmshields, while generally having a lesser diameter than the spherical warmshields, still are large and, generally, exhibit many of the disadvantages of spherical warmshields. They are also not optimum for use with broad detectors as their imaging performance is poor for off-axis rays. Also, they are susceptible to stray light problems resulting from unwanted forward reflections. Flat warmshields are ineffective for off-axis rays, and are also large in diameter, since the reflected rays often spread to large diameters. Hence, flat warmshields cannot generally be placed as far from the detector as is required for reproducing a true coldshielding effect. Flat warmshields are therefore not generally suitable for use in compact systems.

In addition to their individual problems, all presently utilized geometries of warmshields create a ghost image problem. This problem stems from the imperfect absorption by the detector of imaging rays. Those rays that are not absorbed by the detector will be reflected. When these rays impinge on the reflective surface of the above mentioned types of warmshields, they are reflected once more. Because of the geometries of these types of warmshields, a ray, upon its reflection from the warmshield surface, will be reimaged upon the detector, but at a different point than that at which the ray originally impinged on the detector. Thus, there occurs an apparent doubling of the image viewed by the detector.

SUMMARY OF THE INVENTION

The aforementioned problems are overcome and other advantages are obtained in a detector assembly comprising a detector of radiation, a small coldshield, and an uncooled, reflective warmshield which is disposed in front of and is substantially larger than the small coldshield. In accordance with the invention, the warmshield comprises multiple segments, each segment being of substantially toroidal shape. The individual segments of the warmshield are disposed along a central axis of the detector assembly. A cone of imaging rays enters the assembly through an entrance pupil and transverses the central axis of the assembly, passing through openings within each of the segments. The rays further pass through an aperture within the coldshield and impinge on the detector. The small coldshield encloses the detector to shield it from radiation at high angles of incidence and, additionally, has a front wall which is imaged by the reflective warmshield.

The warmshield segments are disposed such that their reflective surfaces face the detector and coldshield to yield an equivalent coldshield of large dimensions, but without the undesireable cryogenically-cooled physical mass that would be required for such a true coldshield. A normal to the reflecting surface of each toroidal segment is directed outside of the detector area. Thus each reflecting surface avoids imaging of the detector upon itself, and instead causes the imaging of the detector to fall upon the surrounding coldshield front wall. The physical size, shape, overlap, and placement of the toroidal segments relative to the coldshield are determined by the desired optical stop and the required minimum overall assembly size.

The particular toroidal shape of this warmshield has the important advantage that reflected rays are redirected towards the cold focal plane but away from the detector. Furthermore, the toroidal construction is such that reflected rays traverse the open volume of the imaging ray cone, thus avoid being blocked by warmshield segments nearer to the focal plane. An unusually small diameter therefore is possible, making this warmshield exceptionally well suited for use in compact detector systems.

In addition to the aforementioned advantages provided by the invention, the segmentation of the warmshield afforded by the individual toroidal elements facilitates the interposition of optical elements within the warmshield. This relieves certain optical design constraints and results in a lower cost for the overall optical system. Such optical elements can be mounted securely and accurately to an uncooled outer housing, as are the reflector segments. Therefore, neither these elements nor their mounts add to the physical or thermal mass of the coldfinger. Therefore, the design of these elements and associated components need not be compromised by, for example, being constrained to being fabricated from overly thin or low weight elements.

The invention, in a preferred embodiment, employs an infrared detector; however, it is to be understood that the principles of the invention apply also to detection of radiation in other parts of the electromagnetic spectrum.

BRIEF DESCRIPTION OF THE DRAWINGS

The foregoing aspects and other features of the invention are explained in the following description, taken in connection with the accompanying drawings wherein.

DETAILED DESCRIPTION

Figure 1:
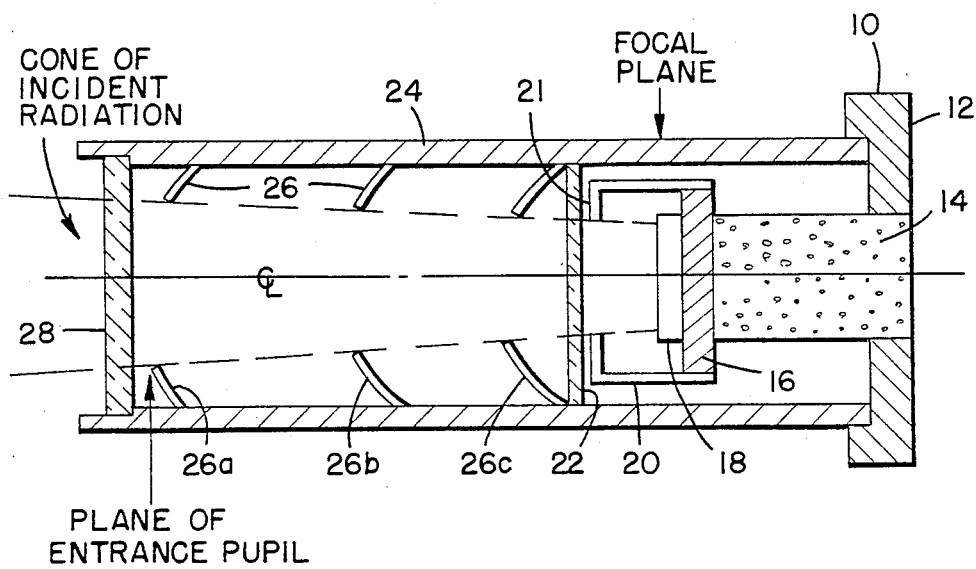
FIG. 1 is a cross-sectional view of an infrared detector assembly using an uncooled, segmented toroidal shield in accordance with an embodiment of the invention.

With reference to FIGS. 1, 2, 3, 4 and 5 there is shown a segmented, toroidal warmshield 26 within a cryogenically-cooled high performance infrared detector assembly 10. The infrared detector assembly 10 comprises a rear wall mounting plate 12, a cryogenic cooler 14 or coldfinger, and a thermally conductive cold support 16. The cooler 14 extends perpendicularly through the plate 12 and contacts a surface of support 16 whereby support 16 is cooled to a cryogenic temperature by the action of cooler 14.

An infrared detector 18 is centrally mounted on a surface of support 16 opposite to the surface connected to cooler 14. A radiation-sensitive surface of detector 18 typically is comprised of an array of individual detector elements and defines the focal plane of the infrared detector assembly 10. Detector 18 is disposed perpendicularly to an incident cone of rays, and is maintained at a cryogenic temperature by the action of cryogenic cooler 14 and thermally conductive support 16. The front surface of support 16 upon which detector 18 is mounted is typically of a larger area than the area of detector 18, thereby providing a peripheral portion of the front surface of support 16 disposed around detector 18. Typically the thickness of detector 18 is such that the underlying surface of support 16 can be considered to lie approximately at the focal plane.

A coldshield 20 having side walls and a front wall 21 encloses detector 18 and the exposed front surface of support 16. The side walls of coldshield 20 are connected both structurally and thermally to, and extend perpendicularly from, an outer edge of support 16. The front wall 21 of coldshield 20 is disposed substantially parallel to the front surface of detector 18. Coldshield 20 is provided with low infrared self-emittance by maintenance of the coldshield 20 at a cryogenic temperature by cooler 14 and thermally conductive support 16. Coldshield 20 excludes rays from impinging on detector 18 except for those contained within the incident cone of rays, the incident cone being allowed to enter the coldshield 20 by means of an aperture within the front wall 21 of coldshield 20. The aperture has a diameter that is approximately equal to the width of the cone of incident rays at the plane of the aperture. The inner surfaces of support 16 and the front and side walls of coldshield 20 surrounding detector 18 are made optically black to shield detector 18 from reflected radiation.

A vacuum window 22 is disposed parallel to the front surface of coldshield 20 and perpendicular to outer wall 24. Outer wall 24 extends perpendicularly from mounting plate 12 forward to the plane of the entrance pupil. Outer wall 24, mounting plate 12, and vacuum window 22 are suitably joined such that they form an airtight container from which the air is evacuated by conventional means. Thus, the cryogenically cooled detector 18, support 16 and coldshield 20 are maintained in a vacuum.

The warmshield 26 comprises a plurality of concave warmshield reflector segments wherein individual segments are further identified by the legends 26a, 26b, and 26c and are mounted within and supported by their outer edge to wall 24 forward of vacuum window 22. Each reflector segment is mounted such that a central opening is disposed symmetrically about the central axis of assembly 10. A front window 28 is mounted to outer wall 24 forward of segment 26a. Window 28 is suitably joined to outer wall 24 such that an airtight, hermetic seal is formed. The opening within segment 26a defines the plane of the entrance pupil for detector 18.

In an alternate embodiment of the invention (not shown) the vacuum window 22 may be omitted, in which case the entire inner volume of the detector assembly 10 is evacuated.

Figure 2:
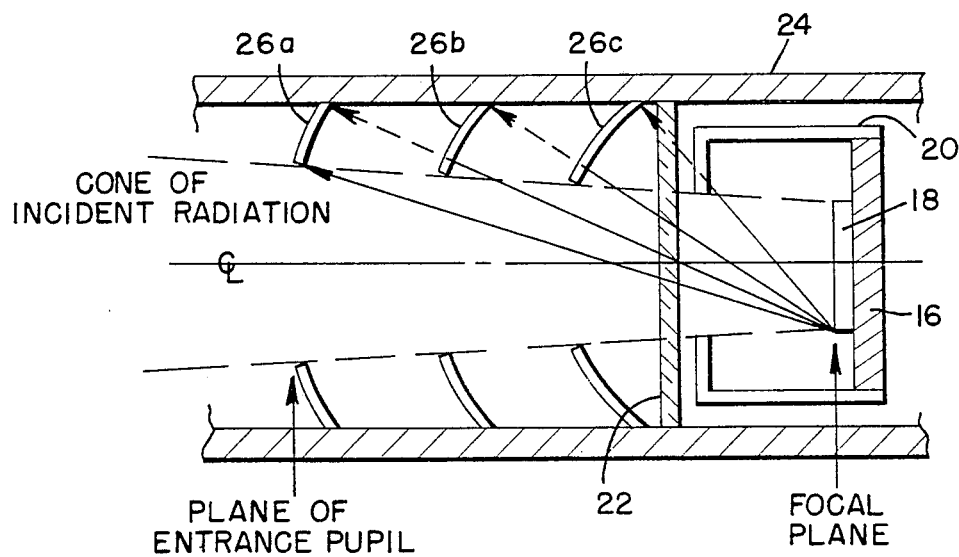
FIG. 2 is a schematic cross-sectional view of an infrared detector assembly showing the physical placement of a plurality of toroidal reflector segments in accordance with an embodiment of the invention.
Figure 4:
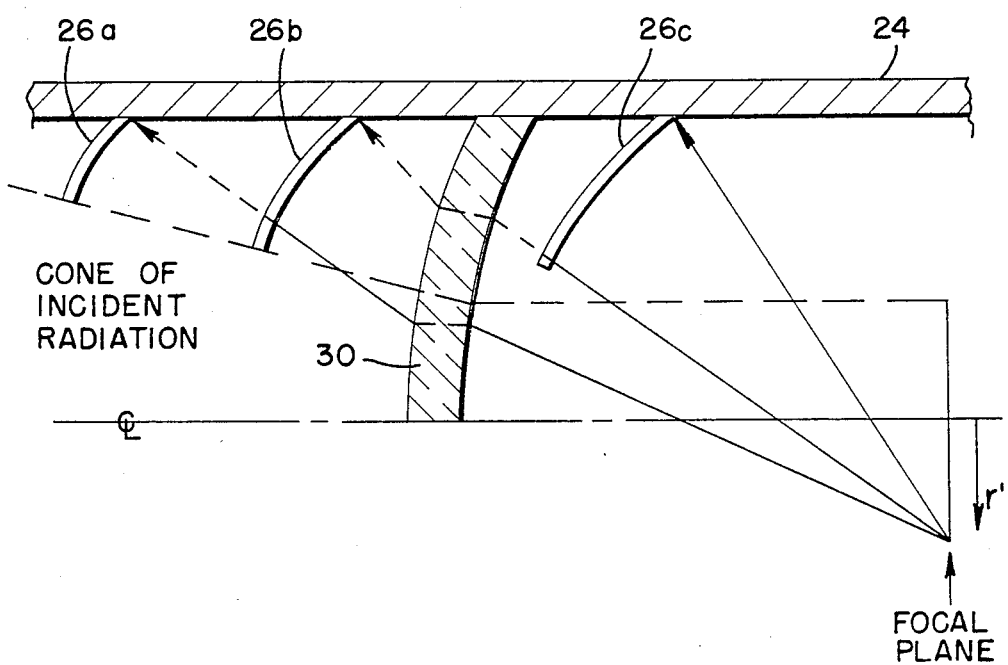
FIG. 4 is a schematic, partial cross-sectional view of an infrared detector assembly with an optical lens element interposed between two of the toroidal reflector segments.

While three toroidal reflector segments 26a, 26b, and 26c are shown in FIGS. 1, 2, and 4 the number could be more or less than three, depending upon the desired focal length of the detector assembly and the maximum allowable assembly size for a given application.

As was previously stated, it is an important feature of this invention that the toroidal warmshield segments 26a, 26b, and 26c, in conjunction with the small coldshield 20, produce the equivalent shielding of a large coldshield about the detector 18. Thus, the plurality of reflective segments 26 must be of proper size and shape. These segments 26 also must be properly disposed along the incident cone of rays relative to coldshield 20 and detector 18.

With the aid of FIGS. 2 and 3 the method of determining the toroidal shape of the individual segments and the placement of the segments will now be described.

The outermost segment 26a is placed first. The lateral displacement from the detector 18 and the diameter of a symmetrically placed opening within segment 26a are selected to provide the desired optical stop for a given infrared detector assembly.

The shape of the inner toric surface of reflector segment 26a is determined in a manner as depicted in FIG.

3. The toroidal surface is generated by revolving a circular arc, defined by the pivoting of vector r, about the centerline axis of symmetry $r_c$. The vector r is, therefore, normal to the toroidal surface at each point upon the surface. The terminus of vector r is placed at or near the detector plane. The locus of termini of all positions of the vector r lies on a circle of radius r' at or near the detector plane. In this embodiment of the invention, the minimum value of the radius r' is approximately one half of the maximum radius of infrared detector 18, in order to prevent unwanted ghost imaging through detector reflections of bright rays admitted through the entrance pupil.

Figure 3:
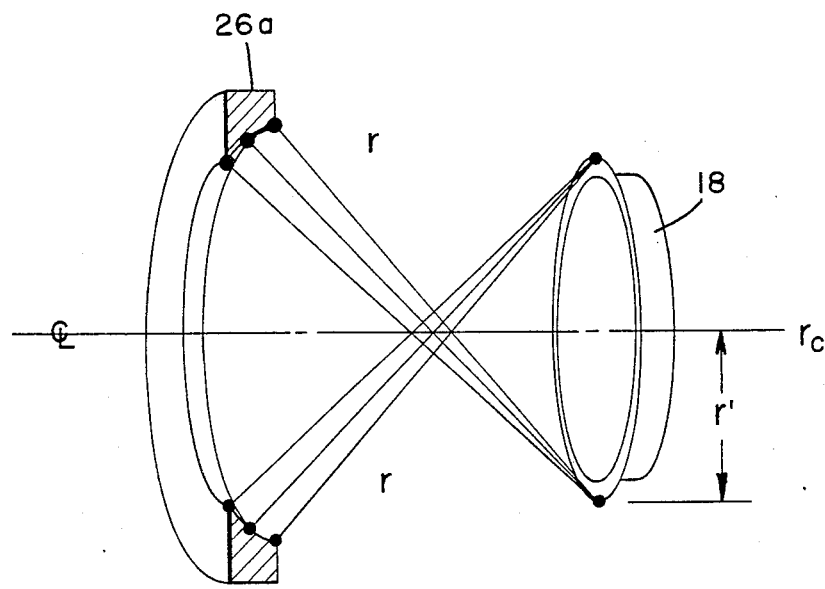
FIG. 3 is a schematic cross-sectional view of one of the toroidal reflector segments showing a geometric principle required to form a toroidal surface which is an important feature of this invention.

In FIG. 3 the vector r is shown at three points upon the toroidal surface both above and below the axis of symmetry $r_c$. It can be seen that the vector r extends diagonally across the axis of symmetry $r_c$ from a point on the periphery of detector 18 to the reflector segment 26a. Inasmuch as r intersects $r_c$, it is apparent that the vector r' is reversed from that of a conventional toroid. If the toroidal surface were generated by conventional means, the vector r would extend from the periphery of detector 18 to the nearest point on segment 26a. The resulting toroidal surface would have characteristics that would require it to be larger than the surface provided by the invention, which would be undesireable for compact detector assembly designs.

An important feature of this embodiment of the invention is that the reflecting surface of warmshield segment 26 has the unique property due to its toroidal geometry, that it images each point of the detector 18 into a defocused ring or band. This defocused ring generally lies immediately outside of the circle defined by r'.

Conversely, this defocused ring of points lying outside of r' is what the detector 18 observes when looking into a toroidal segment. By making the radius of r' large enough to surround the detector 18, the detector 18 observes only the defocused ring of points imaged upon the cold surrounding surface of support 16 and the front wall 21 of coldshield 20.

Support 16 and coldshield 20 are treated by suitable methods, such as being coated, to have a low reflectance for incident rays. The cryogenic temperature of support 16 and coldshield 20 assures that they will have low thermal infrared self-emittance.

Thus, the detector 18 views only the defocused ring of points on the low reflectance, high absorbance support 16 and coldshield 20, thereby simulating the effect of a much larger coldshield surrounding the detector 18. An additional benefit to be derived from the defocused spreading of rays about the detector 18 is that the image observed by each detector element is equalized; correlation of specific detector points with specific coldshield points is thus avoided. Therefore, any imperfections in the low reflectance, high absorbance coating applied to support 16 and coldshield 20 will not be imaged as an unwanted pattern upon detector 18.

Referring once again to FIG. 2, toroidal segment 26b and all subsequent segments 26 are positioned along the central axis by selecting a lateral displacement along the axis relative to the front surface of detector 18 such that the inside diameter opening within a segment 26 is larger than the cone defined by the extreme rays in the incident one of rays. This will ensure that no vignetting of the rays occurs. The segments 26 are also placed such that each segment falls within the cone of rays intercepted by the previous segment such that no rays escape reflection. It can also be seen that there is an overlap of segments in that segment 26b intercepts a ray reflected from detector 18 which would impinge on the upper edge of segment 26a. Likewise segment 26c overlaps the coverage of segment 26b. To assure that rays outside of the desired cone of rays are well intercepted by the overall structure of the plurality of toroidal warmshield segments 26, it is important to optimize the lateral displacement of the toroidal segments 26 from the detector 18. The preferred method for determining the optimum lateral displacement of the toroidal segments 26 from the detector 18 is by the technique of ray-tracing in three dimensions. An illustration of this technique will be described below.

Except for toroidal segment 26c nearest the detector 18, imaging can be attained of any detector element upon the aforesaid defocused ring about the detector 18. However, those rays that reflect from the surface of detector 18 at small angles relative to the detector surface are preferrably intercepted by coldshield 20, since they otherwise would spread to diameters larger than practical if reflected by a toroidal segment 26.

The determination of the dimensions of coldshield 20 is best established by ray tracing, inasmuch as the front wall 21 of the coldshield 20 aids in the capture of rays reflected by toroidal segments 26. Without the forward extension of coldshield 20 the cold focal plane surrounding detector 18 would be required to have a larger diameter, thus making it less suitable for compact detector applications.

An important feature of the invention, shown in FIG. 4, is the ability to incorporate one or more uncooled optical elements between the focal plane and the equivalent cold stop, the optical elements being interposed between toroidal warmshield segments 26. This feature allows elements of substantial power to be placed within the effective coldshield, which provides an additional degree of freedom in designing the overall optical system to be used with the detector assembly. Thus the system optical design can be made more simply and at less cost, without the sacrifice of system optical performance. With current coldshield or warmshield technology, the overall optical system must attain its performance with no substantial optical elements between its exit pupil (the detector entrance pupil) and the image plane (detector 18). This situation complicates and raises the cost of the system optics. If one or more optical elements are interposed among the toroidal segments 26, ray tracing calculation must of course take into account the specific optical properties of the optical element or elements so interposed.

In accordance with the foregoing feature, FIG. 4 shows an optical element 30 disposed between toroidal segments 26b and 26c. It can be seen that the optical properties of element 30 affect both the shape of the inner toric surface of segments 26a and 26b, and also the placement of the segments relative to one another.

GEOMETRICAL PRINCIPLES

Figure 5:
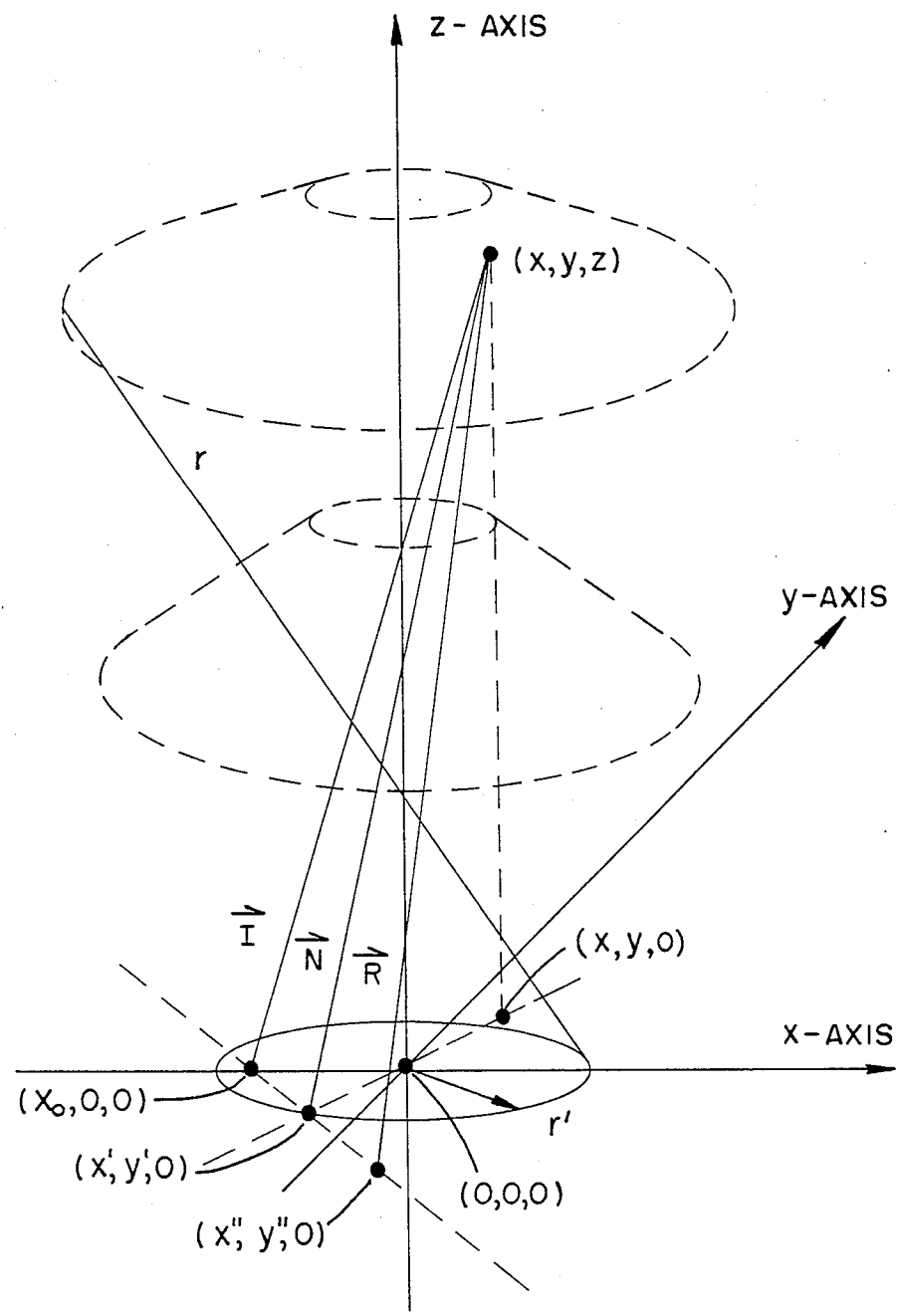
FIG. 5 is a schematic representation of the geometric principles that govern the segmented toroidal warmshield imaging effects.

FIG. 5 illustrates the key geometric principles that govern the segmented toroidal warmshield imaging effects. FIG. 5 is a perspective view of three dimensional space in which the optical axis is coincident with the z axis, the cold focal plane is located on the x-y plane, and the detector is centered on the origin. Two toroidal segments are depicted with dotted lines; each is generated by rotation about the z axis of a circular arc of radius r, decentered from the origin by distance r'.

Point ($x_0$, 0, 0) is taken as a general point on the detector, off-center by distance $x_o$.

Vector I is a general ray eminating from detector point ($x_o$, 0, 0) and incident upon one of the toroidal surfaces at point (x, y, z).

Vector N is the surface normal at point (x, y, z). As has been noted above, all such surface normals pass through a circle in the x-y plane having radius r' and centered at the origin. Point (x', y', 0) on the x-y plane is located on the line connecting point (0, 0, 0), the origin, and point (x, y, 0), the projection on the x-y plane of point (x, y, z) located on the reflector surface. The location of point (x', y', 0) on this line is at distance r' from the origin.

Vector R is the reflection of I, and it intercepts the focal plane at point (x", y", 0). This point lies on the line connecting ($x_0$, 0, 0) and (x', y', 0), and is outside the circle of radius r'. The exact location follows from the facts that I, N, and R, are coplanar, and that the angles of incidence and reflection are equal. The angle of incidence being equal to the angle between I and N. The angle of reflection being equal to the angle between N and R.

Points ($x_0$, 0, 0) and (x", y", 0) are approximately symmetrically located on opposite sides of point (x', y', 0) inasmuch as the rays are approximately parallel with the Z axis.

Upon comparing the geometry of FIG. 5 with the structure of FIG. 1, it can be seen that nearly on-axis rays are readily captured by the surface of cold support 16 that surrounds detector 18. Oblique rays at small angles with respect to the x-y plane are directly intercepted by coldshield 20, which coldshield in various embodiments of the invention may have walls of a circular cylinder or a cylinder of other shape, or of a polygonal or some other shape.

It can be seen that the toroidal warmshield geometry does image a ray originating from the surface of detector 18 (which is inside of the radius r') onto a region lying outside this radius, which is the desired result. If r' is taken larger than the detector, then no detector points image upon themselves. If r' is made as small as approximately half that of the radius of detector 18, then no rays from the entrance pupil can be reflected from the detector to the warmshield and back to the detector. It also follows that surface reflections, due to imperfect absorption by the detector 20, are not reflected back upon the detector. Therefore, no ghost images are created.

By way of contrast with other warmshield geometries, if the shape of the warmshield deviates substantially from that of a torus generated as described above, undesirable imaging effects are created.

For example, spherical warmshield imaging can be viewed as a special toroidal case in which the offset r' is taken as zero. Off-axis detector points thus are imaged upon diametrically-opposite points that are more or less symmetrically disposed about the detector center, point (0, 0, 0). Moreover, the spherical warm shield basically images a point as a point (except for aberration effects), whereas the toroidal warmshield produces the beneficial result of imaging a point as a ring. This feature of toroidal reflector geometry yields a greater dispersion of reflected rays which is beneficial in averaging out any non-uniformities in coldshield temperatures or reflectivities. The toroidal warmshield thus improves upon the uniformity of the coldshielding effect, as well as upon the absolute level of the effect.

It is to be understood that the above described embodiment of the invention is illustrative only and that modifications thereof may occur to those skilled in the art. Accordingly, this invention is not to be regarded as limited to the embodiment disclosed herein but is to be limited only as defined by the appended claims.

What is claimed is:

1. An uncooled reflective shield for a cryogenically cooled detector comprising:
   a reflector having a concave surface and reflective to radiation, said surface facing said detector;
   said surface having a shape of a substantially toroidal segment as defined by the pivoting of a vector diagonally across a centerline axis of symmetry, the vector having a terminus substantially on or near a plane of said detector; and
   means for mounting said reflector relative to said detector such that a ray originating from a point upon said detector and impinging on said reflector is reflected back to a ring-like region surrounding said detector.

2. An infrared detector assembly comprising an uncooled reflective shield for a cryogenically cooled detector, said shield comprising:
   a plurality of reflectors, each of said reflectors having a concave surface and reflective to radiation, each of said surfaces facing said detector;
   the shape of each of the concave surfaces being that of a substantially toroidal segment as defined by the pivoting of a vector diagonally across a centerline of symmetry, the vector having a terminus substantially on or near a plane of said detector; and
   means for mounting said reflectors relative to said detector such that a ray originating from a point upon said detector and impinging on one of said reflectors is reflected back to a ring-like region surrounding said detector; and wherein
   said assembly further comprises:
   coldshield means for shielding said detector from reflected radiation;
   support means for supporting said detector and coldshield means; and
   cryogenic cooler means for cooling said detector and support means to a cryogenic temperature; and wherein
   said detector is mounted by a surface thereof to said support means, said support means being of a larger area than said detector such that a surface of said support means encircles said detector, said detector being enclosed within said coldshield means, said support means being thermally coupled to said cryogenic cooler means to maintain said detector, coldshield means, and support means at a cryogenic temperature.

3. An infrared detector assembly comprising an uncooled reflective shield for a cryogenically cooled detector, said shield comprising:
   a plurality of reflectors each being substantially symmetrically disposed along an optical axis of the detector, each of said reflectors having a concave surface and reflective to radiation, each of said surfaces facing said detector;
   the shape of each of the concave surfaces being that of a substantially toroidal segment as defined by the pivoting of a vector diagonally across a centerline axis of symmetry, the vector having a terminus substantially on or near a plane of said detector; and means for mounting said reflectors relative to said detector such that a ray originating from a point upon said detector and impinging on one of said reflectors is reflected back to a ring-like region surrounding said detector; and wherein said assembly further comprises:

coldshield means for shielding said detector from reflected radiation;

at least one optical element disposed along said optical axis and being interposed between an adjacent two of said reflectors;

support means for supporting said detector and coldshield means; and cryogenic cooler means for cooling said detector and support means to a cryogenic temperature; and wherein said detector is mounted by a surface thereof to said support means, said support means being of a larger area than said detector such that a surface of said support means encircles said detector, said detector being enclosed within said coldshield means, said support means being thermally coupled to said cryogenic cooler means to maintain said detector, coldshield means, and support means at a cryogenic temperature; and wherein said support means positions said detector relative to said coldshield means such that a ray originating from a radiation sensitive surface of said detector is reflected by one of said plurality of reflectors to impinge on said coldshield means or said encircling surface of said support means.

4. A radiation detector assembly comprising:

a detector positioned for receiving incident radiation along a central axis thereto;

coldshield means partially enclosing said detector for including radiation therefrom, said coldshield means having an aperture opening along said axis in front of said detector for admitting radiation to said detector, an interior portion of said coldshield means extending beyond said detector and encircling said detector in a plane transverse to said axis; and a warmshield positioned symmetrically about said axis in front of said coldshield means, said warmshield having at least one reflector with a concave surface having a shape defined as a substantially toroidal segment facing said detector, said surface shape being generated by a radius vector extending diagonally across said axis to a periphery of said detector such that radiation emanating from said detector is reflected by said reflector to a region within said coldshield means and away from said axis, said warmshield having at least one lens element disposed along said central axis between said at least one reflector and said detector.

5. A detector assembly according to claim 4 wherein said warmshield further comprises a second reflector positioned symmetrically in front of said coldshield and having a concave surface facing said detector and wherein;

said surface of said second reflector has a shape defined as a substantially toroidal segment which is generated by a radius vector diagonally across said axis to a periphery of said detector, and an edge of said aperture and an inner edge of the surface of said first-mentioned reflector, and an inner edge of the surface of said second reflector are substantially tangent to a conic surface symmetrically positioned about said axis.

6. A detector assembly as defined in claim 5 wherein said at least one lens element is interposed between said first and said second reflectors, said lens element and said first and said second reflectors directing said radiation emanating from said detector to a ring-like region surrounding said detector.

7. A detector assembly according to claim 4 wherein said coldshield means includes cryogenic means for cooling said coldshield means and said detector, said radiation being infrared radiation.

8. A radiation detector assembly comprising:

a detector positioned for receiving incident radiation along a central axis thereto;

coldshield means partially enclosing said detector for excluding radiation therefrom, said coldshield means having an aperture opening along said axis in front of said detector for admitting radiation to said detector;

a warmshield positioned symmetrically about said axis in front of said coldshield means, said warmshield comprising at least a first and a second reflector each of which has a concave surface facing said detector, each of said surfaces having a shape defined as a substantially toroidal segment which is generated by a radius vector extending diagonally across said axis to a periphery of said detector such that radiation emanating from said detector is reflected by either said first or said second reflector to a point away from said detector; and at least one lens element interposed between said first and said second reflectors, said lens element directing said incident radiation to said detector.

9. An uncooled reflective shield for a cryogenically cooled detector comprising:

a plurality of reflectors serially arranged and symmetrically disposed along an axis of symmetry, each of said reflectors having a concave surface having a shape which is substantially that of a toroidal segment, each of said concave surfaces being reflective to radiation, each of said concave surfaces facing a radiation detector disposed perpendicularly to said axis;

each of said concave surfaces having a shape defined by the pivoting of a vector diagonally across the axis of symmetry, each of the vectors having a terminus substantially on or near a plane of the detector; and at least one lens disposed along the axis of symmetry and interposed between two adjacent reflectors.

10. An uncooled reflective shield as defined in claim 9 wherein a vector defining a concave surface of a reflector disposed forward of said lens passes through said lens, the direction of the vector being modified by an optical characteristic of said lens such that the shape of the concave surface of the associated reflector is a function of the optical characteristic of said lens.

* * * * *